UNITED STATES PATENT OFFICE.

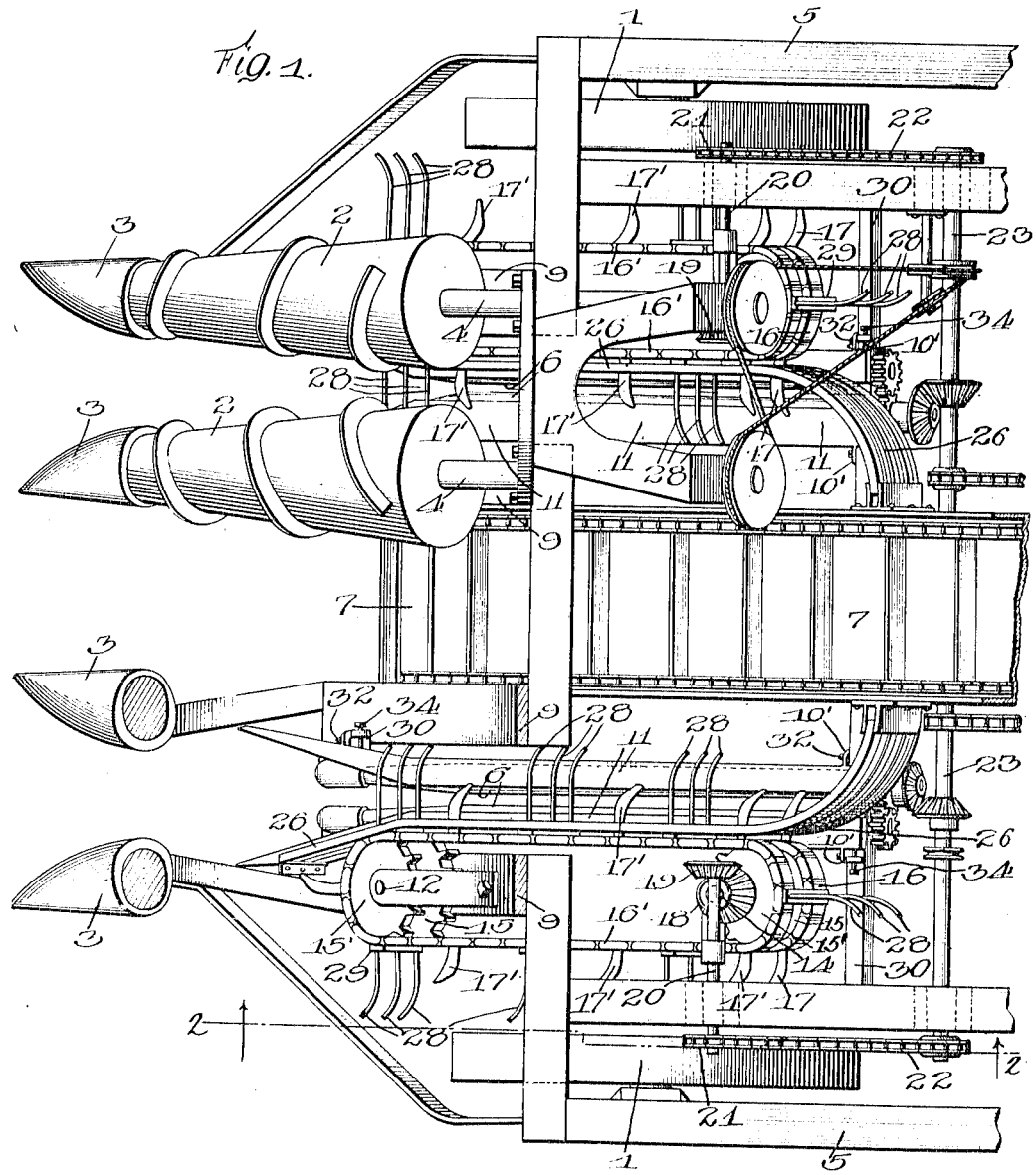

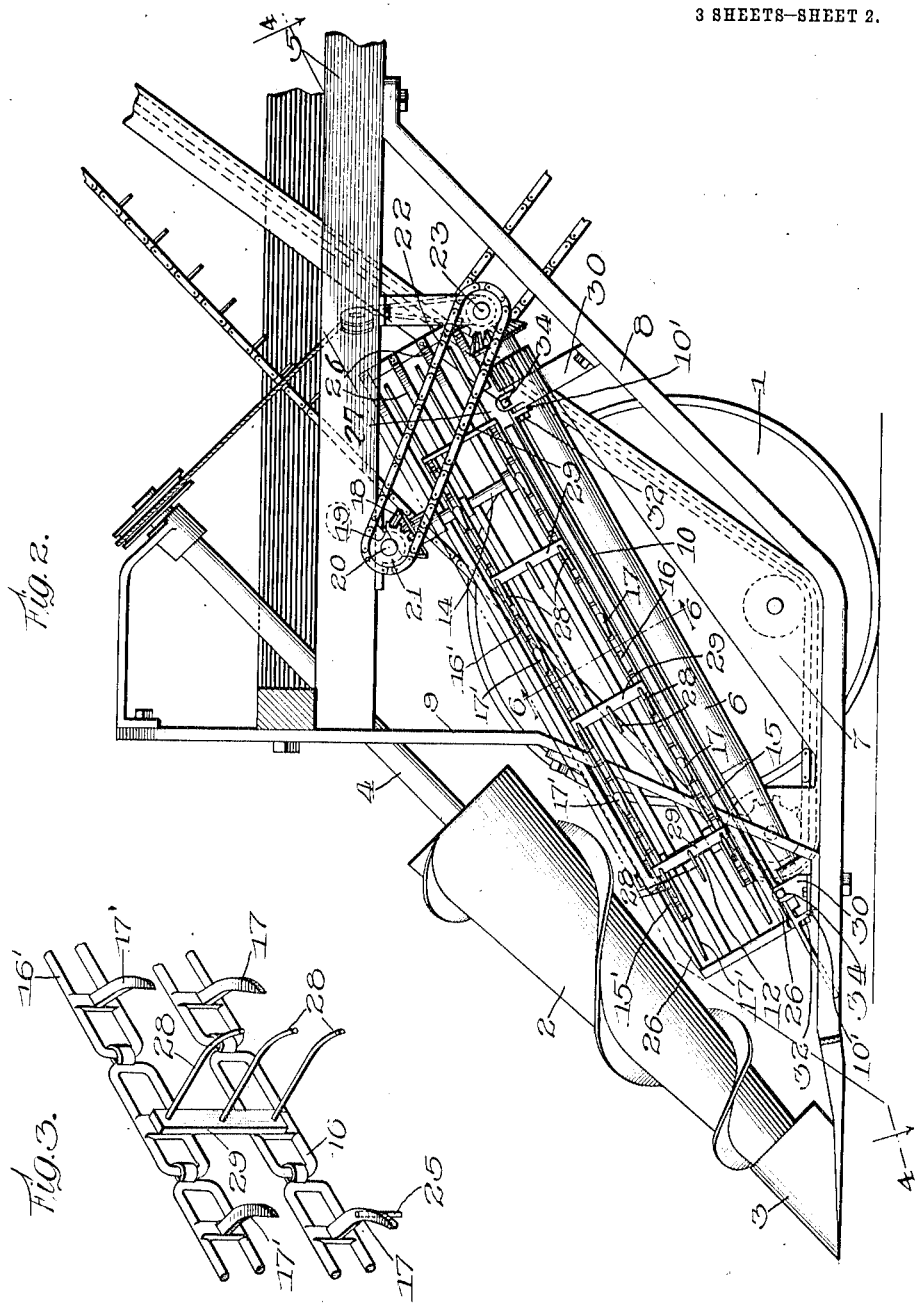

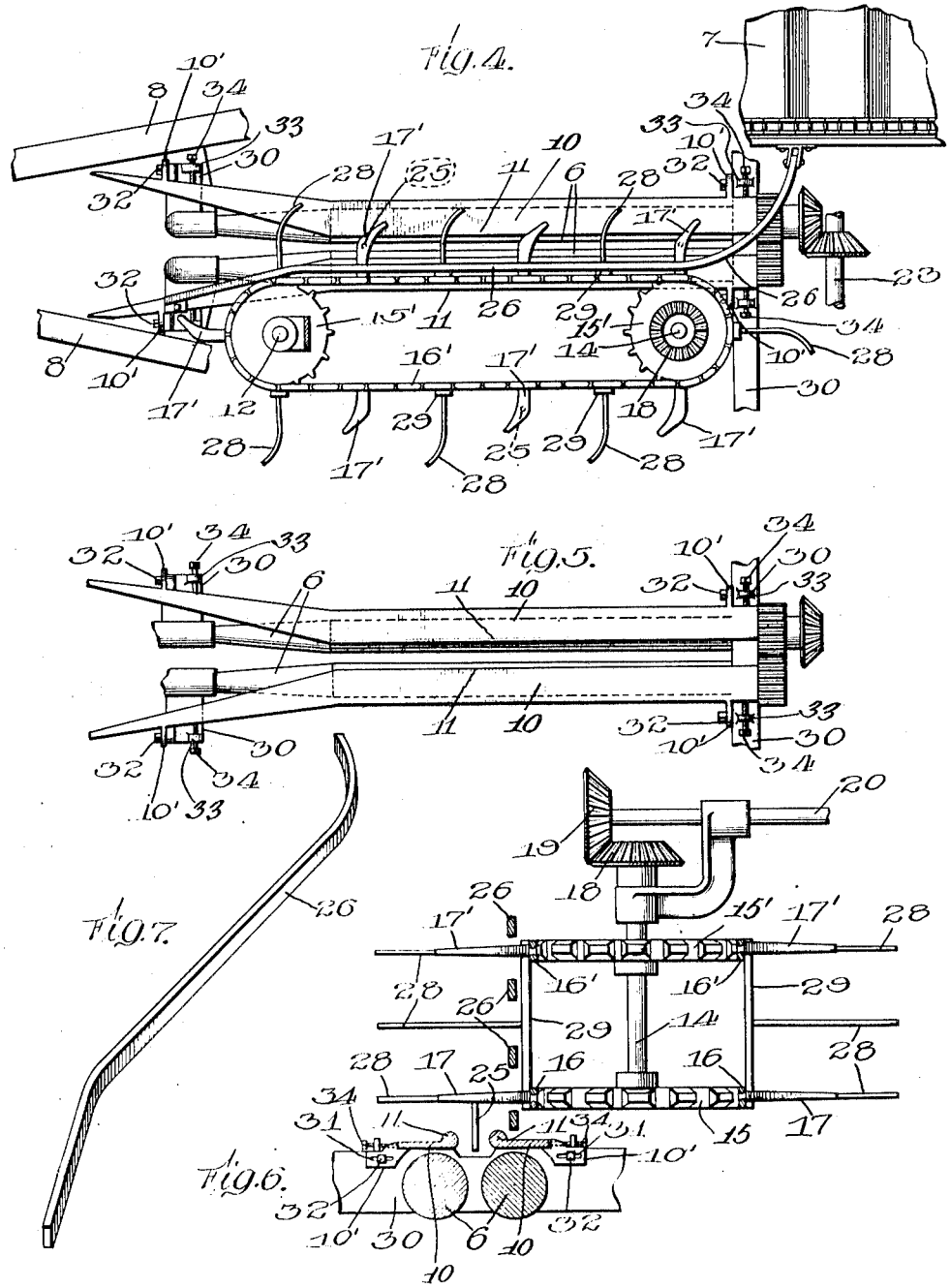

WILLIAM SEWARD BAIRD, OF CHICAGO, ILLINOIS, ASSIGNOR TO BAIRD CORN HUSKER CO., A CORPORATION OF SOUTH DAKOTA.

CORN-HARVESTING MACHINE.

1,102,227. Specification of Letters Patent. Patented July 7, 1914.

Application filed January 30, 1908. Serial No. 413,348.

*To all whom it may concern:*

Be it known that I, WILLIAM SEWARD BAIRD, a citizen of the United States, residing at Chicago, county of Cook, and State of Illinois, have invented certain new and useful Improvements in Corn-Harvesting Machines, of which the following is a description.

My invention relates to that class of devices known as harvesters and to that particular class of harvesters employed for gathering corn by separating the ears from the standing stalks.

The object of my invention is to produce a convenient, efficient, and economical, device of the kind described in which the ears operated upon by the machine are effectually prevented from escaping from the machine after they are detached from the stalk and also for avoiding the shelling of the kernels from the ears by the operation of the mechanism employed for detaching them from the stalks.

To this end my invention consists in the novel construction, arrangement, and combination of parts, herein shown and described and more particularly pointed out in the claims.

In the accompanying drawings wherein like or similar reference characters indicate like or corresponding parts, Figure 1, is a plan view of a portion of a harvesting machine provided with my improvements and with parts removed and broken away to more clearly show the construction. Fig. 2, is a section taken substantially on line 2—2 of Fig. 1. Fig. 3, is a detail perspective view of a portion of the feeding and cleaning mechanism. Fig. 4, is a section taken substantially on line 4—4 of Fig. 2, with parts removed and broken away to more clearly show the construction. Fig. 5, is a detail showing the relation between the snapping rolls and snapping bars. Fig. 6, is a section taken substantially on line 6—6 of Fig. 2. Fig. 7, is a perspective detail of a guard rail for my device.

In the drawings my improvements are shown embodied in a harvesting machine of the general construction shown and described by me in my application for Letters Patent upon corn harvesting machines filed May 2, 1906, Serial No. 314,886 and as therein shown constitutes various improvements upon that machine.

As shown, 1—1 are the supporting wheels, 2—2 the gathering reels, 3—3 the shoes at the lower extremity of the gathering reels and 4—4 are the shafts upon which the gathering reels are mounted, 5 is the main frame of the machine, 6—6 are the snapping rolls, 7 is the conveyer for receiving the ears from the snapping rolls.

My present improvement comprises mechanism adapted to operate in conjunction with the snapping rolls to feed the stalks and ears into a suitable position in the device where the ears may be detached from the stalks, also mechanism to prevent the partial shelling of the ears during the detaching operation, means for preventing the escape of the detached ears from the machine, and insuring their proper delivery to the boot, and mechanism for preventing the accumulation of leaves, husks or other detachable portions of the corn, at the snapping rolls, or adjacent parts, tending to clog or interfere with the operation of the device. The general construction and operation of the machine, aside from these parts is substantially the same in all respects, as shown and described in the application above referred to.

In the form shown, a pair of snapping bars 10—10 are positioned directly above the snapping rolls 6—6 and preferably substantially parallel thereto. The adjacent edges of the snapping bars are positioned in substantially the same relation to each other as the adjacent sides of the snapping rolls. The inner edge of each snapping bar is preferably provided with a part 11 slightly higher than the common plane of the bars, so that as the stalks carrying the ears pass through the space between the snapping rolls and snapping bars, the butts of the ears upon the stalks will be engaged by the part 11 of the snapping bars only in close proximity to, or upon, the cob to detach the ears from the stalk thus relieving the kernels at the butt of the ear of any pressure during the detaching operation.

The transverse position of the snapping bars 10—10 may be controlled in any desired manner. In the form shown two lugs $10^1$ are provided upon the under side of each snapping bar, one near each end, adapted to be bolted or otherwise rigidly secured to the supporting brackets 30—30. As shown each lug is provided with a slotted opening 31 to receive a bolt 32 for firmly securing the bar in position and in the preferred construction a lug 33 is provided upon the bracket 30 and provided with an adjusting screw 34 adapted to bear against the outer edge of the bar to accurately adjust its position and also to prevent the possibility of the spreading of the bars when in operation.

Any suitable means may be employed to properly feed the stalks into the space between the snapping bars and snapping rolls. As shown, a pair of shafts 12—14 each provided with a sprocket wheel 15, are rotatably mounted in suitable bearings attached to convenient portions of the device upon the frame 5, and a carrier sprocket chain 16 is provided upon the sprocket wheels. A plurality of suitably formed teeth 17—17 are provided upon the chain adapted to extend across the space between the snapping bars. The shafts 12—14 are so positioned that the teeth 17 upon one side of the chain will engage any stalks between the reels 2 and force them into the space between the snapping bars insuring their continued movement while so positioned.

The shafts 12—14 may be rotated in any desired manner. In the form shown the shaft 14 is provided with a bevel gear 18 upon its upper end arranged to coöperate with a bevel pinion 19 mounted in suitable bearings upon the frame 5. A sprocket wheel 21 or other suitable means is mounted upon the shaft 20 and connected by means of a chain 22 or other suitable means to a suitable sprocket wheel upon a convenient rotating portion of the mechanism, in the present case upon the shaft 23 provided for operating the snapping rolls.

Suitable means are also provided for preventing the accumulation of leaves or other matter between the snapping rolls or their associated parts. In the form shown a portion of the teeth 17 are provided with a downwardly projecting pin 25 arranged to extend between the snapping bars and engage any material which may be lodged between the bars, and force the same longitudinally of the space to the upper end of the bars where the material is released and permitted to fall by gravity back of the rear wall of the conveyer 7. Any desired means may also be provided to prevent the escape of the detached ears toward the outer side of the snapping bars. In the preferred form shown, a plurality of guard rails 26—26 are rigidly secured to any suitable portions of the machine and positioned in line with the outer edge of the space between the snapping rolls, that is, the inner faces of the guard rails and the outer snapping roll are in substantially a common plane, the preferred arrangement being that the guard rails are positioned in pairs with the teeth 17 projecting through the space between the rails constituting a pair.

In the form shown, a second pair of sprocket wheels $15^1$—$15^1$ are mounted upon the shafts 12 and 14 and connected with a chain $16^1$ provided with teeth $17^1$ substantially as above described, so that the stalks may be supported at two or more points between the reels 2 and snapping rolls 6, a pair of guard rails so formed being provided for each chain, the pins 25 being obviously omitted from the teeth $17^1$ of the chains $16^1$.

The guard rails may be formed in any suitable manner. In the preferred construction shown in Figs. 1 and 7, the outer ends or the ends of the rails above the lower end of the snapping rolls, are bent outward to afford a conveniently wide space for the entrance of the stalks while their opposite ends are curved in the opposite direction and firmly secured to a suitable portion of the machine to rigidly hold them in position. An opening or space 27 is provided in the lower guard rail to permit the free passage of the pins 25 upon teeth 17 at the point where they pass from one side of the rail to the other. In the form shown also a plurality of spring fingers 28 are provided upon the carrier or chains 16 and $16^1$ arranged to extend through the spaces between the guard rails 26 to clear away any leaves, husks or other material which may tend to accumulate in this portion of the device. These fingers may be of any suitable form or construction and attached to the carriers 16 and $16^1$ in any desired manner. As shown any desired number of bars 29 are provided, extending between the carriers each rigidly attached at its extremities to the respective carriers and a plurality of fingers 28, preferably one for each space between the several bars are rigidly mounted upon each bar 29. The fingers 28 are preferably sufficiently resilient to freely pass any stalks or ears without tearing or injuring the same while engaging any leaves or husks and carrying them through the spaces between the rails as the fingers pass from one side of the rails to the other at the curved portion at the upper ends of the rails.

The remaining portions of the machine as shown are substantially the same as described in my previous application hereinbefore referred to and no further description is believed to be required, the operation of my improvements is also believed to be fully set forth in the foregoing description.

While in the foregoing description my improvement is shown in connection with a particular form of corn harvesting machine it is obvious that the same may be employed with any machines of the kind, wherein snapping rolls are employed for removing the ears from the stalks, hence I do not wish to be understood as limiting myself to the exact form or construction shown.

What I claim as new and desire to secure by Letters Patent is:

1. In a corn harvesting machine, a pair of substantially parallel rolls suitably spaced from each other, in combination with a bar positioned above, and in proximity to each roll and extending substantially parallel thereto, brackets for the bars, a downwardly projecting lug on each bar, an adjustable connection between said lug and the bracket, a lug on the bracket and an adjustable member carried by said lug and adapted to engage the bar.

2. In a corn harvesting machine, a pair of substantially parallel rolls suitably spaced from each other, in combination with means arranged above the space between the rolls and arranged to move longitudinally thereof to prevent the lodgment of material in said space, said means including a series of vertically extending fingers.

3. In a corn harvesting machine, a pair of substantially parallel rolls, suitably spaced from each other, a bar positioned above and in proximity to each roll and extending substantially parallel thereto, said bars being arranged in substantially the same horizontal plane and constructed and arranged to coöperate with said rolls to snap the ears from the stalks, in combination with a carrying member having spaced teeth overlying the inner edge of each bar and having vertical projections extending into the space between the bars and means for moving the carrying member longitudinally of the bars.

4. In a corn harvesting machine a pair of substantially parallel rolls suitably spaced from each other, in combination with a carrier extending substantially parallel to said rolls, and vertically extending means rigidly attached to said carrier, arranged above the space between the rolls and arranged to move longitudinally thereof to prevent the lodgment of material in said space.

5. In a corn harvesting machine, a pair of substantially parallel rolls suitably spaced from each other, in combination with a carrier extending substantially parallel to said rolls, a plurality of teeth rigidly attached to said carrier and adapted to bridge the space between said rolls, means mounted upon one or more of said teeth being in vertical registration with said space, and means for operating said carrier to move said teeth longitudinally of said space to prevent the lodgment of material in the space.

6. In a corn harvesting machine, a pair of substantially parallel rolls suitably spaced laterally from each other, a bar positioned above each roll, the bars and rolls being constructed and arranged to coöperate one with the other to snap the stalks, in combination with a carrier member having vertical projections overlying the inner edge of each bar and extending into the space between the bars, and means for imparting movement to said carrier longitudinally of said bars.

7. In a corn harvesting machine, a pair of substantially parallel rolls suitably spaced from each other, and a bar positioned above, and in proximity to, each roll and extending substantially parallel thereof, in combination with a carrier extending substantially parallel to said rolls, a plurality of teeth rigidly attached to said carrier and adapted to bridge the space between said rolls, means mounted upon one or more of said teeth extending at an angle to the direction of said teeth, and means for operating said carrier to move said teeth longitudinally of said space to prevent the lodgment of material in the space.

8. In a corn harvesting machine, a pair of substantially parallel rolls suitably spaced from each other, in combination with a plurality of guard rails spaced vertically from each other and positioned directly above, and substantially parallel to, one of said rolls forming a partition to prevent the escape of the detached ears from the machine and feeding mechanism arranged above the rolls, the parts being constructed and arranged whereby the feeding mechanism projects between the vertically spaced guard rails.

9. In a corn harvesting machine, a pair of substantially parallel rolls suitably spaced from each other, in combination with a plurality of substantially parallel guard rails positioned in a common vertical plane directly above one of said rolls and forming a partition to prevent the escape of the detached ears from the machine, and feeding mechanism having a part arranged to pass between adjacent rails.

10. In a corn harvesting machine a pair of substantially parallel rolls suitably spaced from each other, in combination with a plurality of guard rails spaced from each other vertically and positioned directly above, and substantially parallel to, one of said rolls and forming a partition to prevent the escape of the detached ears from the machine, and feeding mechanism having a part adapted to pass between the adjacent rails.

11. In a corn harvesting machine, a pair of substantially parallel rolls suitably spaced from each other, in combination with a plurality of guard rails positioned in a common vertical plane directly above, and substantially parallel to, one of said rolls and forming a partition to prevent the escape of the detached ears from the machine, and conveyer teeth arranged to pass between adjacent rails.

12. In a corn harvesting machine, a pair of substantially parallel rolls suitably spaced from each other, and a bar positioned above, and substantially parallel to, each roll, in combination with a plurality of guard rails positioned directly above, and substantially parallel to, one of said rolls and forming a partition to prevent the escape of the detached ears from the machine, a conveyer arranged above the rolls, and said rails being separated vertically from one another forming a space into which the conveyer projects.

13. In a corn harvesting machine, a pair of substantially parallel rolls suitably spaced from each other, a bar positioned above each roll with the adjacent edges of the bars each in substantialy the same vertical plane as the corresponding edge of its particular roll, in combination with a plurality of guard rails positioned directly above, and substantially parallel to, one of said rolls and forming a partition to prevent the escape of the detached ears from the machine, a conveyer arranged above the rolls, and said rails being separated vertically from one another forming a space into which the conveyer projects.

14. In a corn harvesting machine, a pair of substantially parallel rolls suitably spaced from each other, in combination with a plurality of guard rails positioned directly above, and substantially parallel to, one of said rolls and forming a partition to prevent the escape of the detached ears from the machine, a plurality of fingers each arranged to extend through a space between said guard rails and bridging the space between said rolls, and means common to said fingers for moving the same longitudinally of said rails when so positioned, a conveyer arranged above the rolls and said rails being separated from one another to form a passageway for the conveyer.

15. In a corn harvesting machine, a pair of substantially parallel rolls suitably spaced from each other, in combination with a plurality of substantially parallel guard rails spaced from each other vertically, and positioned in a common vertical plane directly above, and substantially parallel to, one of said rolls and forming a partition to prevent the escape of the detached ears from the machine, a conveyer arranged above the rolls, and said rails being separated vertically from one another forming a space into which the conveyer projects.

16. In a corn harvesting machine, a pair of substantially parallel rolls suitably spaced from each other, and a bar positioned above and substantially parallel to each roll, in combination with a plurality of substantially parallel guard rails spaced from each other vertically, and positioned in a common vertical plane directly above, and substantially parallel to, one of said rolls and forming a partition to prevent the escape of the detached ears from the machine, a conveyer arranged above the rolls, and said rails being separated vertically from one another forming a space into which the conveyer projects.

17. In a corn harvesting machine, a pair of substantially parallel rolls suitably spaced from each other, and a bar positioned above, and substantially parallel to, each roll, in combination with a plurality of substantially parallel guard rails spaced from each other vertically, and positioned in a common vertical plane directly above, and substantially parallel to, one of said rolls and forming a partition to prevent the escape of the detached ears from the machine, a plurality of fingers each arranged to extend through a space between said guard rails and bridge the space between said rolls and means common to the fingers for moving the same longitudinally of said rails when so positioned.

18. In a corn harvesting machine, a pair of substantially parallel rolls suitably spaced from each other, and a bar positioned above each roll with the inner edges of the bars each in substantially the same vertical plane as the corresponding edge of its particular roll, in combination with a plurality of substantially parallel guard rails positioned directly above, and substantially parallel to one of said rolls and forming a partition to prevent the escape of the detached ears from the machine, a conveyer arranged above the rolls and said rails being separated from one another to form a passage way for the conveyer.

19. In a corn harvesting machine, a pair of substantially parallel rolls suitably spaced from each other, and a bar positioned above each roll with the inner edges of the bars in substantially the same vertical plane as the corresponding side of its particular roll, in combination with a plurality of guard rails positioned directly above, and substantially parallel to, one of said rolls and forming a partition to prevent the escape of the detached ears from the machine, a plurality of resilient fingers each arranged to bridge a space between said guard rails and the space between said rolls, and means common to the several fingers for moving the same longitudinally of said rails when so positioned.

20. In a corn harvesting machine a pair of substantially parallel rolls suitably spaced from each other, and a bar positioned above and substantially parallel to each roll, in combination with a plurality of guard rails spaced from each other vertically, and positioned in a common vertical plane directly above, and substantially parallel to one of said rolls and forming a partition to prevent the escape of the detached ears from the machine, feeding fingers arranged to bridge the space between the rolls and the rails being spaced from one another for affording a passage for said fingers.

21. In a corn harvesting machine, a pair of substantially parallel rolls suitably spaced from each other, and a bar positioned above and substantially parallel to each roll, in combination with a plurality of guard rails positioned in a common vertical plane directly above and substantially parallel to, one of said rolls and forming a partition to prevent the escape of the detached ears from the machine, a plurality of resilient fingers arranged to extend through a space between said guard rails and bridge the space between the rolls, and means common to said fingers for moving the same longitudinally of said rails when so positioned.

22. In a corn harvesting machine, a pair of substantially parallel rolls suitably spaced from each other, in combination with teeth bridging the space between the rolls and arranged to move longitudinally thereof to feed the stalks longitudinally of the space, means upon a portion of said teeth extending between the planes of the axes of said rolls to prevent the lodgment of material therein, and means for controlling the movements of said teeth.

23. In a corn harvesting machine, a pair of substantially parallel rolls suitably spaced from each other, and a bar positioned above and substantially parallel to each roll, in combination with teeth bridging the space between the rolls and arranged to move longitudinally thereof to feed the stalks longitudinally of the space, means upon a portion of said teeth extending between the planes of the axes of the rolls to prevent the lodgment of material therein, and means for controlling the movements of said teeth.

24. In a corn harvesting machine, a pair of substantially parallel rolls suitably spaced from each other, and a bar positioned above and substantially parallel to each roll, in combination with teeth bridging the space between the rolls and arranged to move longitudinally thereof, to feed the stalks longitudinally of the space, means upon a portion of said teeth extending between the planes of the axes of the rolls to prevent the lodgment of material therein, and means for controlling the movements of said teth.

25. In a corn harvesting machine, a pair of substantially parallel rolls suitably spaced from each other, in combination with a bar positioned above, and in proximity to each roll, and extending substantially parallel thereto, and the inner edges of the bars having an upward projection extending longitudinally of the upper surface of said bars.

26. In a corn harvesting machine, a pair of substantially parallel rolls suitably spaced from each other, in combination with a bar positioned above, and in proximity to each roll, and being substantially parallel thereto, and the inner edges of the bars having an upward projection extending longitudinally of the upper surface of said bars, means for adjusting the bars laterally, and independent means for rigidly maintaining said bars in adjusted positions.

27. In a corn harvesting machine, a pair of substantially parallel snapping bars suitably spaced laterally from one another in combination with a series of separated members overlying the inner edge of each bar and having vertical projections extending into the space between the bars, means for moving said members longitudinally of the bars, and associated snapping rolls.

28. In a corn harvesting machine, a pair of substantially parallel rolls suitably spaced from each other, in combination with a carrying member arranged above the rolls and having vertically projecting teeth adapted to move longitudinally of the rolls, means for moving the carrying member, and bars one on each side of said teeth extending longitudinally of the rolls above the same and coöperating with the rolls to break or snap the material acted upon.

In testimony whereof, I have hereunto signed my name in the presence of two subscribing witnesses.

WILLIAM SEWARD BAIRD.

Witnesses:
  B. CHALMERS,
  CHARLES I. COBB.